(12) United States Patent
Locantore et al.

(10) Patent No.: US 10,975,247 B2
(45) Date of Patent: Apr. 13, 2021

(54) COMPOSITE OF AN ANTIBACTERIAL POLYMERIC MATERIAL, METHOD FOR THE PREPARATION AND USE THEREOF

(71) Applicants: THALES ALENIA SPACE ITALIA S.p.A. CON UNICO SOCIO, Rome (IT); GUARNIFLON S.p.A., Castelli Calepio (IT); ARCARI Srl, Limbiate (IT)

(72) Inventors: Ilaria Locantore, Turin (IT); Vincenzo Guarnieri, Turin (IT); Cesare Lobascio, Turin (IT); Emanuele Colombo, Limbiate (IT); Massimo Villano, Castelli Calepio (IT); Giacomo Simoni, Castelli Calepio (IT); Lucia Grizzaffi, Turin (IT)

(73) Assignees: Guarniflon S.p.A., Catelli Calepio (IT); Arcari, Srl, Limbiate (IT); Thales Alenia Space Italia S.p.A. Con Unico Socio, Rome (IT)

(*) Notice: Subject to any disclaimer, the term of this patent is extended or adjusted under 35 U.S.C. 154(b) by 68 days.

(21) Appl. No.: 15/821,073

(22) Filed: Nov. 22, 2017

(65) Prior Publication Data

US 2018/0148580 A1 May 31, 2018

(30) Foreign Application Priority Data

Nov. 25, 2016 (IT) .......................... 102016000119819

(51) Int. Cl.
| | | |
|---|---|---|
| C09D 5/14 | (2006.01) |
| B32B 27/12 | (2006.01) |
| C08K 9/10 | (2006.01) |
| B32B 27/30 | (2006.01) |
| A01N 65/20 | (2009.01) |
| A01N 65/16 | (2009.01) |
| A01N 25/10 | (2006.01) |
| A01N 59/16 | (2006.01) |
| C03C 25/305 | (2018.01) |
| C09D 127/18 | (2006.01) |
| C08K 3/08 | (2006.01) |
| C08K 7/28 | (2006.01) |
| C08K 7/26 | (2006.01) |
| C08K 3/40 | (2006.01) |
| C08K 3/015 | (2018.01) |
| B32B 37/00 | (2006.01) |
| C08K 3/34 | (2006.01) |
| C08K 9/02 | (2006.01) |

(52) U.S. Cl.
CPC .............. C09D 5/14 (2013.01); A01N 25/10 (2013.01); A01N 59/16 (2013.01); A01N 65/16 (2013.01); A01N 65/20 (2013.01); B32B 27/12 (2013.01); B32B 27/304 (2013.01); C03C 25/305 (2013.01); C08K 9/10 (2013.01); C09D 127/18 (2013.01); B32B 37/00 (2013.01); C03C 2218/11 (2013.01); C08K 3/015 (2018.01); C08K 3/08 (2013.01); C08K 3/34 (2013.01); C08K 3/40 (2013.01); C08K 7/26 (2013.01); C08K 7/28 (2013.01); C08K 9/02 (2013.01); C08K 2003/085 (2013.01); C08K 2003/0806 (2013.01); C08K 2003/0862 (2013.01); C08K 2003/0893 (2013.01)

(58) Field of Classification Search
USPC ........ 424/400, 402, 404; 442/59, 64–68, 88, 442/123
See application file for complete search history.

(56) References Cited

U.S. PATENT DOCUMENTS

| | | | |
|---|---|---|---|
| 4,959,268 A | 9/1990 | Hagiwara et al. | |
| 5,180,585 A | 1/1993 | Jacobson et al. | |
| 2011/0182951 A1* | 7/2011 | Burger | A01N 59/16 424/400 |
| 2011/0287251 A1* | 11/2011 | Leech | C09D 127/18 428/327 |

FOREIGN PATENT DOCUMENTS

| | | |
|---|---|---|
| CN | 1521097 A | 8/2004 |
| CN | 1804157 A | 7/2006 |
| CN | 102076745 A | 5/2011 |
| EP | 0253663 | 1/1988 |
| RU | 2465288 | 10/2012 |
| WO | WO 92/09429 | 6/1992 |
| WO | WO 02099181 | 12/2002 |
| WO | WO 03055941 | 7/2003 |
| WO | WO 2010006782 | 1/2010 |

OTHER PUBLICATIONS

Extended European Search Report for Euroepan Patent Application No. 17203656.8-1102 dated Feb. 12, 2018.
Italian Search Report and Written Opinion for Italian Patent Application No. IT 201600119819 dated Jul. 10, 2017 with English translation.
Chinese First Office Action dated Nov. 28, 2019 for Chinese Application No. 201711202428.4.
Eurasian Search Report for Eurasian Patent Application No. 201792357 dated May 30, 2018. (no translation).

* cited by examiner

Primary Examiner — Lynda Salvatore
(74) Attorney, Agent, or Firm — McCarter & English, LLP

(57) ABSTRACT

A non-porous composite is provided that includes a textile substrate impregnated with a first fluoropolymer and a film of polymeric material comprising at least one second fluoropolymer filled with porous particles of a silicate having a granulometric dimension d50 less than or equal to 5 μm and a porosity ranging from 30 to 60% in volume and loaded with antibacterial ions of at least one metal selected from the group consisting of silver, copper, zinc and nickel. A method for production of the composite and a containing and/or transport element for a fluid, preferably water, produced with the composite, are also provided.

13 Claims, No Drawings

COMPOSITE OF AN ANTIBACTERIAL POLYMERIC MATERIAL, METHOD FOR THE PREPARATION AND USE THEREOF

CROSS-REFERENCE TO RELATED APPLICATION

This application claims priority from Italian Patent Application No. 102016000119819, filed on Nov. 25, 2016, the disclosure of which is incorporated by reference.

TECHNICAL FIELD

The present invention concerns a non-porous and antibacterial composite and use thereof to contain and/or transport a fluid, for example in the aerospace sector.

BACKGROUND OF THE INVENTION

It is known that in the aerospace sector the transport of fluids, for example drinking water, encounters numerous difficulties. In particular, it is known that containers made of FEP are used for the conservation and transport of drinking water during space voyages. These containers are attacked less by bacteria than containers made of other polymers. Nevertheless, they require sterilization after every use. Alternatively, metal containers and pipes are used but these require a very costly pre-treatment to minimize the surface roughness which favours microbial growth. Furthermore, they are particularly heavy.

Lastly, disinfectants are periodically added to the liquids transported, for example colloidal silver or iodine. The use of silver is very costly and has proved to have a non-stable biocidal activity over time. The use of iodine instead requires the removal of the water prior to consumption by means of a system of filters which obviously reduce the space available in a space module and require maintenance by the crew.

Therefore the search for new materials, for producing containing elements and/or elements for the transport of fluids which avoid the use of chemicals, and which are inexpensive and lightweight, is ongoing.

SUMMARY OF THE INVENTION

The object of the present invention is therefore to provide a new material which solves the above-mentioned problems.

Said object is achieved by the present invention relative to a composite according to claim 1, a method for the preparation thereof according to claim 10 and a containing and/or transport element according to claim 12.

DETAILED DESCRIPTION OF THE INVENTION

In particular, a non-porous composite is provided comprising a textile substrate impregnated with a first fluoropolymer and at least one film of polymer material comprising at least one second fluoropolymer filled with porous particles of a silicate loaded with antibacterial ions of at least one metal selected from the group consisting of silver, copper, zinc and nickel.

The second fluoropolymer can be polytetrafluoroethylene or a copolymer of tetrafluoroethylene (TFE). Examples of said polymers can be copolymers of tetrafluoroethylene (TFE)-perfluoroalkyl vinyl ether (FVE), in which the number of carbon atoms of the FVE ranges between 1 and 5, or TFE-hexafluoropropylene (HPF)-FVE copolymers. In one embodiment, the copolymer used is a copolymer of TFE-perfluoropropyl vinyl ether (PPVE) in which the PPVE content is in a quantity of less than 1% by weight out of the total weight of the TFE, more preferably a quantity between 0.05 and 0.5%.

The molecular weight of the TFE copolymers is a fifth of that of the PTFE. This modification results in a polymer with improved melting performance, significantly contributing to an improved workability of the polymer.

Advantageously, furthermore, the use of PPVE inhibits crystallization, thus increasing the amorphous content and therefore preserving the mechanical properties typical of the fluoropolymer. Furthermore, the PPVE ensures improved distribution of the crystallites in the amorphous matrix, drastically reducing cold flow.

The fluoropolymer thus modified therefore has improved weldability, lower deformability under load, a denser polymeric structure with fewer voids, lower permeability, improved relaxation after compression stress, greater transparency, improved filmability and improved surface workability.

In another embodiment of the present invention, the fluoropolymer is polytetrafluoroethylene (PTFE-homopolymer of tetrafluoroethylene, TFE).

The main properties of PTFE are extreme chemical inertia, excellent resistance to heat and ageing, excellent dielectric properties, self-lubricating properties and a minimum friction coefficient. PTFE is attacked only by alkaline metals in metallic form, chlorine trifluorides and elemental fluorine at high pressure and high temperature.

PTFE has a low heat transmission factor and can therefore be considered a heat-insulating material. It also has flame retardant properties and is stable for long periods up to 260° C.

PTFE also has excellent dielectric properties over a broad range of temperatures and frequencies.

Since it does not absorb water, it maintains said properties also after prolonged exposure to atmospheric agents. The electric resistance is not affected by the operating temperature. Furthermore, resistance to the formation of an electric arc is very high and the spark does not generate carbon residues but only non-conductive vapours. The other dielectric properties (for example dielectric constant, surface resistivity, volume resistivity and power factor) have values of great interest.

In terms of mechanical properties, the compression resistance to a predefined deformation is one of the best characteristics of PTFE, over a broad range of operating temperatures. Bending strength, elastic memory and hardness are other characteristics that distinguish PTFE. Also its tribological properties, specifically a very low friction coefficient, make PTFE a unique material.

The second fluoropolymer can furthermore be filled with one or more inorganic and/or organic additives such as, for example, fibreglass, carbon, graphite, molybdenum bisulphide, bronze, steel, ceramic powder and mixtures thereof. The use of said additives improves the performance of the fluoropolymer, for example they increase its compression strength, hardness and resistance to wear, reduce the thermal expansion coefficient, and surface and volume resistivity.

The porous particles present in the polymer material are preferably porous particles of glass. The porous particles have a granulometric dimension d50 lower than or equal to 5 μm.

By the term "granulometric dimension d50" it is meant the median diameter or the mean value of the granulometric distribution, and it is the value of the diameter of the particles at 50% of the cumulative distribution.

The porous particles have a porosity ranging from 30 to 60%, preferably a porosity of 50% in volume (expressed as a percentage ratio between volume of the cavities and total volume).

The polymeric material can be produced with methods known in the art. For example, the PTFE in powder form is compressed in a mould to obtain a preform at ambient temperature. After removal from the mould, the preform is heated in an oven to above its melting temperature and sintered. The consolidation of the particles during sintering is called coalescence and produces a uniform resistant structure.

According to the present invention, the fluoropolymer is mixed at 0° C. with the porous particles of silicate loaded with the antibacterial ions in a mixer. The low temperature of the PTFE promotes the mixing, preventing the mixture from overheating.

The mixture thus obtained is preformed, in a cylindrical shape, in a press and subsequently sintered. The thermal cycle includes a ramp to reach the sintering temperature, a plateau at the sintering temperature and a cooling phase. The cylinder thus obtained is then transformed into a non-porous film by means of an exfoliation process using, for example, a horizontal lathe with controlled feed and a blade which exfoliates a film with uniform thickness in a controlled manner, as known in the art.

The film of polymer material obtained can comprise between 95 and 99% by weight of the second fluoropolymer and between 1 and 5% by weight of porous silicate particles out of a total weight of the polymer material. The film obtained has a thickness equal to or less than 100 micron.

The textile substrate of the composite of the present invention can be made of fibres selected from the group consisting of fibreglass, aramid fibres and carbon fibres. The aramid fibres are, for example, Nomex fibres and Kevlar fibres. During preparation of the composite of the invention, the textile substrate is impregnated with a first fluoropolymer to allow coupling of the textile substrate with the film of polymer material.

The fluoropolymer (understood as the sum of the first and second fluoropolymer) is present in the composite in a quantity higher than 50% by weight out of the total weight of the composite.

The composite of the invention, advantageously, can be stored for long periods; it allows the production of impermeable flexible bags and also piping or other containers and surface coatings.

In addition to the mechanical strength, chemical inertia and applicability to extreme temperatures (−200° to +260° C.) of the PTFE, the composite of the invention due to the presence of antibacterial particles allows re-use of the containers and surfaces and therefore a saving in terms of costs, volumes and spaces occupied.

The composite of the invention is prepared via the following steps:
a) mixing at least one second fluoropolymer with porous particles of a silicate having a granulometric dimension d50 lower than or equal to 5 μm and a porosity ranging from 30 to 60% in volume and loaded with antibacterial ions of at least one metal selected from the group consisting of silver, copper, zinc and nickel to obtain a polymer material;
b) preforming, in a cylindrical shape, in a press and subsequently sintering said polymer material obtained from step a) to obtain a cylinder of polymer material;
c) exfoliating said cylinder of polymer material obtained in step b) to obtain a film of polymer material with uniform thickness;
d) impregnating a textile substrate with a first fluoropolymer in aqueous dispersion by sintering at, at least 400° C., so that said first fluoropolymer penetrates between the fibres of the textile substrate;
e) applying by means of hot lamination and under pressure at least one film of polymer material obtained from step c) to said textile substrate impregnated with the first fluoropolymer.

Preferably step b) is performed at a temperature of at least 255° C. and applying a pressure of at least 4 bar.

The first fluoropolymer, with which step a) of impregnation of the textile substrate is performed, is selected from the group consisting of polytetrafluoroethylene, copolymers of tetrafluoroethylene-perfluoroalkyl vinyl ether in which the number of carbon atoms of the FVE ranges from 1 to 5 and tetrafluoroethylene-hexafluoropropylene copolymers and is present in a quantity greater than 30% by weight out of the total weight of the composite.

The impregnated textile substrate obtained from step d) can have a thickness less than or equal to 1100 micron.

In one embodiment, the composite of the invention comprises a textile substrate laminated on both sides with a film of polymer material as described above.

The composite of the invention has excellent flexibility, maintaining good mechanical strength. It is also impermeable, non-porous, lightweight, resistant over a broad temperature range (from −73° C. to 260° C.), chemically inert and has antibacterial properties.

The composite according to the invention can be used for the production of a containing and/or transport element for a fluid, preferably water. The composite of the invention can therefore be used for the production of flexible bags for the transport and storage of fluids but also for the production of food containers or for piping, for example in the aerospace sector.

It can also be used for the production of antibacterial coating panels.

Further characteristics of the present invention will become clear from the following description of some merely illustrative and non-limiting examples.

Example 1

Antibacterial Properties of the Polymeric Material

In a laboratory, standard methods (mixing, preforming and sintering) were used to prepare three rods (diameter: 60 mm, height 80 mm) of polymeric material according to the invention (copolymer of TFE-perfluoropropyl vinyl ether (PPVE) in which the PPVE content is in a quantity of approximately 0.3% by weight with respect to the TFE content) with different percentages of particles of silicate loaded with silver ions.

The three samples were tested for their antibacterial activity with Staphylococcus aureus ATCC 6538 and Klebsiella pneumonia ATCC 4352 according to the ISO 22196: 2007 standard procedure: "Plastics-Measurement of antibacterial activity on plastics surfaces".

The experimental conditions were:
Microorganisms: *Klebsiella pneumoniae* ATCC 4352 and *Staphylococcus aureus* ATCC 6538.
Inoculum: 0.4 mL of bacterial suspension, 6×105 UFC/mL diluted in nutrient broth and saline solution with a 1/500 ratio.
Contact time: 24 hours at 37° C.
Neutralizing solution: 10 ml (30 g/l lecithin, 30 g/l Tween 80, 5 g/l sodium thiosulphate, 1 g/l L-histidine, 0.68 g/l KH2PO4, (pH at 7.2+/−0.2)).

Sterilization of sample: yes, 20 minutes at 121° C.
Film application: yes (40 mm×40 mm).
Calculation of number of vital bacteria:

$N=(100 \times C \times D \times V)/A$ where:

N=number of vital bacteria recovered per cm² per test tube.
C=mean number of colonies counted.
D=dilution factor of the colonies counted.
V=volume, in ml, of neutralizing solution added.
A=area, in mm², of the film (1600 mm²).
The antibacterial activity of the samples, R, is calculated as follows:

$R=(Ut-U0)-(At-U0)=Ut-At$ where:
U0=mean of the logarithm of the number of bacteria recovered from the reference sample immediately after the inoculation, in cells/cm².
Ut=mean of the logarithm of the number of bacteria recovered from the reference sample after 24 hours of contact, in cells/cm².
At=mean of the logarithm of the number of bacteria recovered from the sample after 24 hours of contact, in cells/cm².
R=antimicrobial activity.
The results are given in Table 1.

TABLE 1

| Sample (% antibacterial loaded particles) | Klebsiella pneumoniae ATTC 4352 [cell/cm²] presence at $T_0$ | Staphylococcus aureus ATCC 6538 [cell/cm²] presence at $T_0$ | Klebsiella pneumoniae ATTC 4352 [cell/cm²] presence after 24 h | Staphylococcus aureus ATCC 6538 [cell/cm²] presence after 24 h |
|---|---|---|---|---|
| 0.5% | $2.00 \times 10^4$ | $2.00 \times 10^4$ | 0 | $1.92 \times 10^4$ |
| 1.5% | $2.06 \times 10^4$ | $2.06 \times 10^4$ | 0 | 0 |
| 3% | $2.02 \times 10^4$ | $2.08 \times 10^4$ | 0 | 0 |

The same test was reproduced to study the fungal growth. Also in this case no fungal growth was observed.

Example 2

The composite of the invention produced by means of the methodology described above, laminating the non-porous film of antibacterial fluoropolymer on both sides of an impregnated fibreglass fabric, has the mechanical properties given in Table 2.

TABLE 2

| | |
|---|---|
| Textile substrate | Fibreglass fabric (E-glass) |
| Coating | TFM skived film |
| Coating % | 80 ± 2% |
| Nominal thickness of sample | 272 µm |
| Total weight of composite | 525 g/m2 ± 5% |
| Tensile strength (measured with method BS 3424 part 4, method 6) | >1519 N/5 cm |
| Tearing strength (measured with method BS 3474 part 4) | >21.72 N |
| Adhesive resistance of coating to the textile substrate (measured with method BS 3424 part 7) | >40 N/cm |
| Dielectric distribution (measured with method BS 2782 part 2, method 220) | >9210 V |
| Operating temperatures | −73 ÷ 260° C. |

The invention claimed is:

1. A non-porous composite comprising:
a textile substrate defining two sides;
a coating impregnating both sides of the textile substrate so that the coating penetrates the textile substrate, the coating consisting solely of an aqueous dispersion of a first fluoropolymer, wherein the first fluoropolymer is selected from the group consisting of polytetrafluoroethylene, copolymers of tetrafluoroethylene-perfluoroalkyl vinyl ether in which the number of carbon atoms ranges from 1 to 5, and tetrafluoroethylene-hexafluoropropylene copolymers, and
a film of polymeric material comprising at least one second fluoropolymer filled with porous particles of a silicate having a granulometric dimension d50 less than or equal to 5 µm and a porosity ranging from 30 to 60% in volume and loaded with antibacterial ions of at least one metal selected from the group consisting of silver, copper, zinc and nickel, wherein the second fluoropolymer is selected from the group consisting of polytetrafluoroethylene, copolymers of tetrafluoroethylene-perfluoroalkyl vinyl ether, wherein the number of carbon atoms of the perfluoroalkyl vinyl ether ranges from 1 to 5, and tetrafluoroethylene-hexafluoropropylene copolymers, and wherein the film of polymeric material is laminated on both sides of the coated textile substrate and couples to the first fluoropolymer that impregnates the textile substrate.

2. The composite according to claim 1, characterized in that said textile substrate is produced with fibres selected from the group consisting of fibreglass, aramid fibres and carbon fibres.

3. The composite according to claim 1, characterized in that the sum of the first and the second fluoropolymer in the composite is greater than 50% by weight of the total weight of the composite.

4. The composite according to claim 1, characterized in that said second fluoropolymer is a copolymer of tetrafluoroethylene-perfluoroalkyl vinyl ether wherein the perfluoropropyl vinyl ether is present in a quantity lower than 1% by weight of the total weight of the tetrafluoroethylene.

5. The composite according to claim 4, characterized in that the perfluoropropyl vinyl ether is present in a quantity ranging from 0.05 to 0.5% by weight of the total weight of the tetrafluoroethylene.

6. The composite according to claim 1, characterized in that said second fluoropolymer is polytetrafluoroethylene.

7. The composite according to claim 1, characterized in that said second fluoropolymer is filled with at least one inorganic or organic additive selected from the group consisting of fibreglass, carbon, graphite, molybdenum bisulphide, bronze, steel, ceramic powder and mixtures thereof.

8. The composite according to claim 1, characterized in that said porous particles of silicate are porous particles of glass.

9. The composite according to claim 1, characterized in that said polymeric material comprises between 95 and 99% by weight of said second fluoropolymer and between 1 and 5% by weight of said porous particles of silicate out of the total weight of the polymeric material.

10. A method for the preparation of a composite according to claim 1 comprising the steps of:
 a) mixing at least one second fluoropolymer with porous particles of a silicate having a granulometric dimension d50 lower than or equal to 5 μm and a porosity ranging from 30 to 60% in volume and loaded with antibacterial ions of at least one metal selected from the group consisting of silver, copper, zinc and nickel to obtain a polymeric material;
 b) preforming, in a cylindrical shape, in a press and subsequently sintering said polymeric material obtained from step a) to obtain a cylinder of polymeric material;
 c) exfoliating said cylinder of polymeric material obtained in step b) to obtain a film of polymer material with uniform thickness;
 d) impregnating a textile substrate with a first fluoropolymer in aqueous dispersion by sintering at, at least 400° C., so that said first fluoropolymer penetrates between the fibres of the textile substrate;
 e) applying by means of hot lamination and under pressure at least one film of polymeric material obtained from step c) to said textile substrate impregnated with said first fluoropolymer.

11. The method according to claim 10, characterized in that said step e) is performed at a temperature of at least 255° C. applying a pressure of at least 4 bar.

12. A containing or transport element for a fluid made with the composite according to claim 1.

13. The containing or transport element according to claim 12, characterized in that the fluid is water.

* * * * *